United States Patent [19]

Sasae et al.

[11] Patent Number: 5,516,974
[45] Date of Patent: May 14, 1996

[54] TREATING AGENT FOR MAKING HARMLESS AND IMMOBILIZING FLY ASH CONTAINING NOXIOUS METALS AND A METHOD FOR THE IMMOBILIZING TREATMENT USING IT

[75] Inventors: Taiichiro Sasae; Tomio Nishida, both of Nagaokakyo; Kazuya Katayama, Uji; Masanori Oshima, Hikone, all of Japan

[73] Assignee: Polution Sciences Laboratory Incorporated, Togane-Chiba, Japan

[21] Appl. No.: 215,371

[22] Filed: Mar. 21, 1994

[30] Foreign Application Priority Data

Nov. 22, 1993 [JP] Japan ................................ 5-317369

[51] Int. Cl.$^6$ ........................................ A62D 3/00
[52] U.S. Cl. ........................ 588/256; 588/249; 405/128
[58] Field of Search ............................ 588/256, 257; 405/128, 129; 106/708

[56] References Cited

U.S. PATENT DOCUMENTS

| | | | |
|---|---|---|---|
| 3,720,609 | 3/1973 | Smith et al. | 588/256 X |
| 4,101,332 | 7/1978 | Nicholson | 588/256 |
| 4,226,630 | 10/1980 | Styron | 588/256 X |
| 4,600,514 | 7/1986 | Conner | 405/129 X |
| 4,737,356 | 4/1988 | O'Hara et al. | 588/256 |
| 5,284,636 | 2/1994 | Goff et al. | 588/256 X |
| 5,285,000 | 2/1994 | Schwitzgebel | 405/128 X |
| 5,346,549 | 9/1994 | Johnson | 106/708 |
| 5,399,048 | 3/1995 | Walker | 405/129 X |

FOREIGN PATENT DOCUMENTS

| | | |
|---|---|---|
| 19716 | 4/1982 | Japan. |
| 129195 | 7/1985 | Japan. |
| 61710 | 10/1992 | Japan. |

*Primary Examiner*—Dennis L. Taylor
*Attorney, Agent, or Firm*—Morgan & Finnegan

[57] ABSTRACT

The present invention provides an immobilizing agent for making harmless the detrimental metals contained in fly ash formed from an urban dust incinerating plant and a method for immobilizing the fly ash. The treating agent according to the present invention contains α starch and/or dextrin (component A), sodium silicate and/or a hydrogen phosphate compound (component B) and an allophane having a molecular ratio of $SiO_2/Al_2O_3$ of not lower than 2 (component C). It may also further contain cement, bentonite, calcined gypsum and fly ash formed from a coal thermo-electric power plant. The mixing ratio of the components A, B and C is preferably 100 parts by weight: 20 to 160 parts by weight: 40 to 180 parts by weight respectively. The treating agent is mixed with the above-mentioned fly ash and water is added to it and the mixture is milled and then used. The treating agent of the present invention can enclose detrimental metals stably with no second elution and thus is effective for immobilizing treatment.

4 Claims, No Drawings

TREATING AGENT FOR MAKING HARMLESS AND IMMOBILIZING FLY ASH CONTAINING NOXIOUS METALS AND A METHOD FOR THE IMMOBILIZING TREATMENT USING IT

BACKGROUND OF THE INVENTION

The present invention relates to a treating agent effective for making harmless and immobilizing noxious metals contained in fly ash discharged from an urban dust incinerator plant and a method for the immobilizing treatment using it.

Conventionally, fly ash formed from an urban dust incinerator plant containing noxious metals has been carried out of the incinerator after mixed with bottom ash of the incinerator and filled up in a final reclaiming site or has been sprayed by water to prevent scattering of ash and then carried out in most cases.

In Japan, the fly ash of an urban dust incinerator has been made to be treated as a particularly controlled general waste after "the law related to the treatment and the cleaning of waste" was amended on October, 1991 and enforced on July, 1992 and thus it should be filled up after treated to be harmless.

However, a large amounts of lime (CaO) and calcium hydroxide ($Ca(OH)_2$) are blown into the flue in an excess of the theoretical amount to make harmless the detrimental gases discharged such as hydrochloride (HCl) and sulfur oxide (SOX) and thus unreacted lime and calcium oxide, reaction product thereof with gases, calcium chloride ($CaCl_2$) and gypsum ($CaSO_4$) are collected in the electric dust collector and the bag filter together with fly ash formed from an urban dust incinerator plant and discharged in a mixed condition with the fly ash. Therefore, such fly ash collected contains a large amount of detrimental metals and shows as high an alkalinity as a pH of not lower than 12, generally 12.0 to 13.5 and has a property of re-eluting lead (Pb), cadmium (Cd), zinc (Zn) and copper (Cu) and thus is difficult to be treated to be made harmless and immobilized by conventional technologies.

Though general methods include at present the cement solidification method by using common portland cement and special cements, the chemical treatment method by using sulfur chelate compounds or the acid extraction method in which the detrimental metals are extracted from fly ash with an acid, each methods involve various problems including secondary pollution and insufficient treatment for making harmless and stabilizing. Thus, the problems in the treatment of fly ash formed from an urban dust incinerator plant containing detrimental metals for making harmless and immobilizing have not been solved at present.

For solving the various problems, disclosed methods include, for example, those shown in Japanese Laid-open Patent Publication No. 129195 of 1985 and Japanese Patent Publication Nos. 19716 of 1982 and 61710 of 1992. However, the disclosure in Japanese Laid-open Patent Publication No. 129195 of 1985 aims an enhancement in cured strength, while Japanese Patent Publication No. 19716 of 1982 aims an inhibition of diffusion of detrimental metals by using cement as the base and excluding the factors preventing cure of the cement by using calcium hydroxide ($Ca(OH)_2$), aluminum sulfate ($Al_2(SO_4)_3$) and sodium carbonate ($Na_2CO_3$) and curing it to prepare cured products such as bricks and blocks and lowering contact of it with eluted water to inhibit diffusion of detrimental metals. They are thus not treatments for immobilizing detrimental metals by a direct reaction with chemicals.

Japanese Patent Publication No. 61710 of 1992 discloses a method for the treatment of residual ash and fly ash formed from a dust incinerator plant in which they are fixed with phosphoric acid ($H_3PO_4$) and calcium hydroxide. However, in this patent, the mixing ratio of residual ash to fly ash (3 to 49:1) is considered to be important and it is required to mix it with calcium hydroxide previously before spraying a water-soluble phosphate source and the amount to be mixed is required to be adjusted according to the calcium hydroxide content in fly ash. Thus, it is highly dependent on pH as seen in Examples of EPA test (optimum pH=7.5 to 12.0). A fixing treatment by the method is difficult by a consideration on the solubility of detrimental metals other than Pb and Cd disclosed there such as Cu and Zn depending to the pH. In Japan, it is regulated to separate residual ash from fly ash and to discharge them each separately by law. Hence, residual ash and fly ash cannot be mixed together for the treatment to make it harmless and fly ash showing a high alkalinity should be treated to be made harmless and immobilized alone. Thus, the treating method according to Japanese Patent Publication No. 61710 of 1992 cannot be adopted.

The subject of the present invention is to solve various problems in the conventional technologies for the treatment of detrimental metals contained in fly ash formed from a dust incinerator plant and to provide a treating agent for making it harmless and immobilize it and a method for the immobilizing treatment by sealing and fixing it surely and immobilizing it.

We, inventors, have investigated and have found that fly ash formed from a dust incinerator plant can be treated to be harmless and immobilized by a direct reaction by using a treating agent for making harmless and immobilizing it containing specific starch, sodium silicate or a hydrogen phosphate compound and allophane and a treating agent for making harmless and immobilizing it in wider sense further containing at least one selected from the group consisting of cement, gypsum or fly ash formed from a coal thermoelectric power plant in the above-mentioned treating agent for making harmless and immobilizing it (special cement solidifier in the case containing cement) to complete the present invention.

SUMMARY OF THE INVENTION

The treating agent for making harmless and immobilizing according to the present invention is aimed to make harmless and immobilize fly ash formed from an urban dust incinerator plant containing at least one detrimental metal selected from the group consisting of cadmium, lead, zinc and copper and characterized by that the treating agent contains component A: at least one selected from the group consisting of α starch and dextrin, component B: at least one selected from the group consisting of sodium silicate and a hydrogen phosphate compound, and component C: an allophane having a molecular ratio of $SiO_2/Al_2O_3$ of not less than 2.

The present invention is also characterized by that said treating agent further contains at least one selected from the group consisting of cement, bentonite, calcined gypsum and fly ash formed from a coal thermoelectric power plant in addition to the above components A to C. In this case, a wider more excellent immobilizing effect can be given.

In addition, the present invention provides a method for making harmless and immobilizing fly ash formed from an urban dust incinerator plant containing detrimental metals. The treating method is characterized by that a treating agent containing the above components A to C is mixed with said fly ash in a given ratio and then water is added and the mixture is milled and also characterized by that at least one selected from the group consisting of cement, bentonite, calcined gypsum and fly ash formed from a coal thermo-electric power plant is further mixed in addition to the above components A to C. According to the method, a cheaper more excellent immobilizing effect can be given.

First, the treating agent for making harmless and immobilizing fly ash formed from an urban dust incinerator plant according to the present invention will be illustrated in details as follows.

DETAILED DESCRIPTION OF THE INVENTION

The treating agent for making harmless and immobilizing fly ash according to the present invention contains the above-mentioned components A to C and contains at least one treated starch selected from the group consisting of starch and dextrin as the component A. Usually, starch is extracted from barley, oats, rye, wheat, corn, rice, potato and spinach, etc. by heat or an acid and then dried. However, such starches are hardly soluble in water and cannot be used in the present invention. The treated starch used in the present invention ($\alpha$ starch and dextrin) is a gelatinized starch ($\alpha$ starch) prepared by being heated in an aqueous solution of a sulfate or a phosphate at 70° to 150° C. or a white or yellow dextrin prepared by heating $\alpha$ starch further at 120° to 160° C. under a vacuum of 60 to 100 mmHg for ca. 2 hours and then drying it at a low temperature of not higher than 60° C. and purifying it.

The effect of making harmless and immobilizing fly ash against detrimental metals becomes higher in the order of yellow dextrin, white dextrin and gelatinized starch. Maltose and D-glucose prepared by treating and purifying it at a higher temperature than in the case of yellow dextrin show substantially no immobilizing effect. Therefore, to get an effect of making harmless and immobilizing fly ash, it is preferred to contain a higher amount of yellow dextrin. However, in the case a hydrogen phosphate is contained as the component B, even if gelatinized starch or white dextrin is present, they are converted to dextrin by the heat of reaction evolved by the reaction with fly ash formed from an urban dust incinerator plant to promote the effect of making harmless and immobilizing fly ash given by the treated starch.

The component B in the present invention is at least one selected from the group consisting of sodium silicate and hydrogen phosphate compounds. Sodium silicate is expressed by a chemical formula: $Na_2O \cdot nSiO_2 \cdot nH_2O$ and includes three types of ortho, meta and anhydrous. The three types of sodium silicate shows no significant difference to each other in the immobilizing effect and thus any of them can be used. However, ortho and anhydrous are more preferred according to easy handling including low change in quality during storage.

The treating effect of sodium silicate is more effective for a metal which can not be eluted by an increase in pH among the detrimental metals and it attributes to the immobilization of Zn among them and has a high buffering activity to ensure a pH range effective for the reaction.

On the other hand, the phosphoric acid compound contained in the treating agent for making harmless and immobilizing fly ash according to the present invention is restricted to a hydrogen phosphate compound. The hydrogen phosphate compound is added to give synergetic effect with the treatment by the above-mentioned component A. Thus, it is characterized by that a hydrogen phosphate compound is added for the catalysis of further alphanizing or dextrinizing $\alpha$ starch or dextrin and a reaction mainly managed by the above-mentioned component A makes harmless and immobilize the detrimental metals such as Pb, Cd, Cu and Zn. And, it is also a difference from the conventional technologies.

Thus, the hydrogen phosphate compounds in the present invention include, for example, sodium monohydrogen phosphate ($Na_2HPO_4$), sodium dihydrogen phosphate ($NaH_2PO_4$), ammonium dihydrogen phosphate ($NH_4HPO_4$), ammonium monohydrogen phosphate (($NH_4)_2HPO_4$), potassium monohydrogen phosphate ($K_2H_2PO_4$), potassium dihydrogen phosphate ($KH_2PO_4$) and aluminum dihydrogen phosphate ($Al(H_2PO_4)_3$). It is essential they contain phosphate group and hydrogen group. The reason why they shall contain not only phosphate group but also hydrogen group is that the hydrogen group shows a catalytic effect on the change in the molecular structure during making the above-mentioned component A to be alphanized or dextrinized and a phosphate alone and a hydrogen phosphate together with it show a particularly remarkable difference to each other. Thus, a hydrogen phosphate compound is essential for completing the reaction in powder form as seen in the present invention. Therefore, a phosphate compound containing no hydrogen group does not attribute to the treatment for making harmless and immobilizing fly ash absolutely.

Furthermore, among the hydrogen phosphate compounds, a dihydrogen compound is superior to a monohydrogen compound in the effect as the treating agent for making harmless and immobilizing fly ash according to the present invention. The reason why the treating agent of the present invention contains no sulfate but a hydrogen phosphate compound is a sulfate is converted to sulfur by the reductive action of soil bacteria in the reclaiming site after the immobilizing treatment to be in danger of causing secondary pollution.

Further, the treating agent of the present invention contains an allophane having a molecular ratio of $SiO_2/Al_2O_3$ of not lower than 2 as the component C. The allophane is a sort of clay mineral. Though the cation exchange activity of a clay mineral has been well known, the allophane is classified as a hydrated mixed gel of noncrystalline clay or amorphous clay alumina silicate. In general, the molecular ratio of $SiO_2 Al_2O_3$ is said to be 1 to 2. In the present invention, the ion exchange activity is enhanced by using one of higher molecular ratio to make the treatment for making harmless and immobilizing fly ash effective. The allophane in the present invention has a higher aggregating activity than the other clays and aggregates the reaction products formed by other additives used in the present invention more stably to make them more hardly elutable. Therefore, though the clay minerals such as bentonite and acid clay are more excellent than allophane in the ion exchange activity and hence can be used as additives to the treating agent of the present invention, an allophane having a molecular ratio of not lower than 2 is more preferable to be used taking in consideration the synergetic effect with aggregating activity. For the purification of allophane having such a molecular ratio, it is enough to sieve it to not more than 100 μm by using air or a centrifugal separator.

Though the above three components A to C are the main constituents of the treating agent of the present invention, at least one selected from the group consisting of cement, bentonite, calcined gypsum and fly ash formed from a coal thermoelectric power plant can be added and used as the treating agent for making harmless and immobilizing fly ash depending on the necessity of insurance of the curing space and treatment due to the admixture of detrimental metals to be treated and other detrimental substances. When cement is used, so-called crystallizing action is utilized for the treatment for making harmless and immobilizing the detrimental metals and the detrimental substances by ion exchange and inclusion in the crystal. However, because the completion of crystallization requires as long a period as 3 to 7 days, a curing space should be ensured. However, the treating agent and the treating method by a combination of the above-mentioned treating agent for making harmless and immobilizing fly ash and cement can treat a wide range of detrimental substances for a long-term immobilization and the method is particularly effective for the treatment of fly ash formed from an urban dust incinerator plant. The types of the cement which can be used include, for example, hydraulic cements such as portland cements (common, super rapid curing, medium melting heat, sulfate-resistant, etc.) and mixed cements (fly ash, blast furnace, silica etc.) but the cement used is not particularly restricted.

In addition, calcinated gypsum or fly ash formed from a coal thermoelectric power plant is added supplementarily depending on the pH of the fly ash formed from an urban dust incineration plant. Calcinated gypsum is used when it is desired to complete the reaction with no substantial change in pH in the case the above-mentioned treating agent for making harmless and immobilizing fly ash is added, while fly ash formed from a coal thermoelectric power plant is used when it is desired to increase the hydrogen ion concentration during or after the treatment for making harmless and immobilizing fly ash. Their amounts used are appropriately varied according to the pH of fly ash formed from an urban dust incineration plant itself.

The fly ash formed from an urban dust incineration plant mainly consists of $SiO_2$ and $Al_2O_3$ and the composition ratio is approximately in the range of 20 to 70% $SiO_2$ and 5 to 45% $Al_2O_3$. $BaO$, $FeO$, $CaO$, $MgO$, $K_2O$ and $Na_2O$ are also contained to extents of 1 to 7%. Further, the fly ash used contains not less than 80% of particles having a particle size of 5 to 60 μm.

Now, the mixing ratio of each components in the treating agent for making harmless and immobilizing fly ash according to the present invention will be illustrated. The mixing ratio of each components in the present invention is appropriately adjusted since the property of fly ash is different depending on the type of the dust incineration plant. In general, 20 to 160 parts by weight of the component B and 40 to 180 parts by weight of the component C are mixed with 100 parts by weight of the component A. More preferred mixing ratio of the components A:B:C is 100 parts by weight: 80 to 160 parts by weight: 40 to 120 parts by weight.

The mixing ratio of α starch and dextrin as the component A should be varied depending on their contents of α starch and dextrin to prevent the change in the effect of immobilizing treatment. It is preferred to use in the range of 15 to 50 weight %. Sodium silicate as the component B shows a very high hydrogen ion concentration by alone and hence it gives a high alkalinity when excessively added to be feared to re-elute detrimental metals. It is preferred to be used in the range of 5 to 20 weight %. The content of hydrogen phosphate compound is varied according to the type to some extent. A dihydrogen phosphate compound gives a higher effect on converting the starch to α type starch or dextrin than a monohydrogen phosphate compound and thus gives a higher contribution on the treatment for making harmless and immobilizing fly ash. It is more preferred to use a dihydrogen phosphate compound as the hydrogen phosphate compound at a content in the range of 20 to 60 weight %.

On the other hand, the immobilizing effect of the allophane as the component C depends on the molecular ratio of $SiO_2/Al_2O_3$ and one having the molecular ratio of not lower than 2 is added. The content is usually in the range of 20 to 60 weight % for giving a desired effect of immobilizing treatment.

Furthermore, among cement, bentonite, calcined gypsum and fly ash formed from a coal thermoelectric power plant, cement is used in many cases as it is excellent in crystallization reaction and is very cheap. It is preferred to use it in the range of 50 to 90 weight % based on the total amount of the above-mentioned components A to C. The case calcined gypsum and fly ash formed from a coal thermoelectric power plant are added is restricted to the case a special fly ash formed from an urban dust incinerating plant and fly ash formed from a dust incinerating plant discharged from an intermediate treater of industrial waste are treated by using the treating agent for making harmless and immobilizing fly ash according to the present invention. The amounts of calcined gypsum and fly ash formed from a coal thermoelectric power plant are appropriately adjusted so that the hydrogen ion concentation comes to be in the range of 10 to 12 during or after the treatment. Bentonite is added to supplement the action of allophane and $H_2$ type, Na type and Ca type can be used. The amount added in the range of 5 to 30 weight % based on the total amount of the above-mentioned components A to C is particularly preferable.

The object of the method for the treatment according to the present invention is to make harmless and immobilize fly ash formed from an urban dust incinerating plant containing detrimental metals. According to this treating method, it is enough a treating agent containing the above-mentioned components A to C is mixed with the above-mentioned fly ash in a given ratio and then water is added and the mixture is milled. The procedure is simple and the detrimental metals can be made harmless and immobilized at low cost. At least one selected from the group consisting of cement, bentonite, calcined gypsum and fly ash formed from a coal thermoelectric power plant may be added together with the above-mentioned components A to C. In this case, a more wider, cheaper and more excellent immobilizing effect can be attained.

The reason why the treating agent for making harmless and immobilizing fly ash formed from an urban dust incinerating plant according to the present invention can immobilize detrimental heavy metals with no re-elution even in a highly alkaline condition is that each components A to C react directly with detrimental metals and thus the hydroxylation reaction products formed by ion exchange reactions and alkaline reactions and the reaction products such as excess hydrogen phosphate compounds attributing to the reactions making starch to α type starch and dextrin are adsorbed on the charged noncrystalline allophane particle and they are aggregated by being included in excess starch. Though the ion exchange reaction of noncrystalline allophane is not so changed at a pH between 2.5 and 6, the cation exchange ability becomes higher under as high an alkaline condition as fly ash formed from an urban dust incinerating plant which is a subject of the treatment of the present invention. Bodium silicate is an alkaline substance having a high buffering property. It reacts with water during an immobilizing treatment and hydroxides dissociated from $SiO_2$ and $Al_2O_3$ react with detrimental metals and enclose them in the gel substance.

As to the starch contained in the treating agent for making harmless and immobilizing fly ash formed from an urban dust incinerating plant according to the present invention, much part of the mechanism of formation of starch itself is still unknown and it can be considered that the effect of enclosing the reaction products also attributes by the adhesion of gelatinating by utilizing the water-solubility of α starch and dextrin. Furthermore, the action of the cement added is that hydroxides are formed by the high alkalinity of cement or ion exchange reaction and crystallization reaction affect it and a treating agent for making harmless and immobilizing fly ash according to the present invention further containing cement gives immobilizing effect for a long period accompanied by the progress of crystallization reaction. Calcinated gypsum and a coal fly ash are added in the treating agent for making harmless and immobilizing fly ash according to the present invention mainly for the purpose of adjusting the hydrogen ion concentration. Bentonite is added to improve the ion exchange capacity and to prevent moisture absorption during storage of the treating agent for making harmless and immobilizing fly ash.

The treating agent for making harmless and immobilizing fly ash according to the present invention can enclose detrimental metals by the complex activity as shown above. Also in the case cement is further added, it is characterized by that an immobilizing treatment can be made with no curing period for the completion of crystallization reaction specific to cement by the early immobilizing action of the treating agent for making harmless and immobilizing fly ash. As seen in the Examples of the present invention shown below, the treating agent for immobilizing fly ash according to the present invention is absolutely independent on the pH and in this aspect it is quite different from the invention described in Japanese Patent Publication No. 61710 of 1992.

By the action shown above, the treating agent of the present invention can immobilize detrimental metals contained in fly ash formed from an urban dust incinerating plant with no re-elution requiring no curing period.

PREFERRED EMBODIMENTS OF THE INVENTION

The present invention will be concretely illustrated by Examples as follows. The present invention is not restricted to them.

In the following Examples, fly ash formed from an urban dust incinerating plant (containing cadmium, lead, zinc and copper) was used as the subject to be treated.

The effect of making harmless and immobilizing fly ash was determined by measuring the eluted quantities of each detrimental metals in accordance with the elution test method of Notification No. 13 of the Environment Agency of Japan.

Each Examples also describe the eluted quantities and the hydrogen ion concentrations (pH) for the fly ash used in the experiment when not treated as well as the criteria standard on industrial waste containing metals and so on issued by the Law of the Prime Minister's Office on Feb. 17, 1972 in Japan.

EXAMPLE 1

Immobilizing effect of the main constituents in the treating agent for making harmless and immobilizing fly ash according to the present invention First, the immobilizing effect of the main constituents in the treating agent for making harmless and immobilizing fly ash according to the present invention by each alone was confirmed.

|     | Amount added |
| --- | --- |
| (1) α starch | 10 to 100 parts by weight |
| (2) Dextrin | 10 to 100 parts by weight |
| (3) Allophane (mol. ratio ≧ 2) | 10 to 100 parts by weight |
| (4) Sodium dihydrogen phosphate ($NaH_2PO_4 \cdot 2H_2O$) | 10 to 100 parts by weight |
| (5) Sodium orthosilicate | 1 to 30 parts by weight |
| (6) Sodium silicate anhydride | 1 to 30 parts by weight |

Each main constitutents mentioned above were added to 1 ton (1000 parts by weight) of the above-mentioned fly ash in the range of the parts by weight shown above and then 500 kg of water was added and the mixture was milled and elution test was carried out with no curing period to determine the eluted quantities of detrimental metals.

The experimental results are shown in Table 1.

TABLE 1

Immobilizing effect of the main constituents in the treating agent according to the present invention

| Constituents | Amount added pts. by wt. | pH | Eluted amount (mg/l) Pb | Zn | Cd | Cu |
| --- | --- | --- | --- | --- | --- | --- |
| Fly ash (No treated) | — | 12.6 | 198 | 5.80 | 0.10 | 0.39 |
| α starch | 10 | 12.5 | 41.9 | 3.99 | 0.06 | 0.20 |
|  | 30 | 12.6 | 12.2 | 2.91 | 0.05 | 0.15 |
|  | 50 | 12.6 | 4.85 | 2.02 | 0.05 | 0.13 |
|  | 70 | 12.5 | 2.92 | 1.75 | 0.06 | 0.11 |
|  | 100 | 12.6 | 0.81 | 1.03 | 0.05 | 0.09 |
| Dextrin | 10 | 12.5 | 31.3 | 3.46 | 0.05 | 0.18 |
|  | 30 | 12.5 | 11.8 | 2.77 | 0.05 | 0.14 |
|  | 50 | 12.5 | 3.10 | 1.88 | 0.06 | 0.13 |
|  | 70 | 12.6 | 1.95 | 1.49 | 0.05 | 0.09 |
|  | 100 | 12.6 | 0.77 | 1.00 | 0.05 | 0.08 |
| Allophane | 10 | 12.4 | 162 | 4.22 | 0.06 | 0.20 |
|  | 30 | 12.2 | 91.1 | 3.77 | 0.05 | 0.17 |
|  | 50 | 12.1 | 40.2 | 2.96 | 0.04 | 0.15 |
|  | 70 | 12.0 | 21.3 | 2.03 | 0.05 | 0.14 |
|  | 100 | 12.0 | 10.9 | 1.87 | 0.06 | 0.14 |
| Sodium dihydrogen phosphate | 10 | 12.6 | 79.1 | 4.72 | 0.05 | 0.19 |
|  | 30 | 12.5 | 52.1 | 4.05 | 0.05 | 0.17 |
|  | 50 | 12.5 | 24.8 | 3.22 | 0.05 | 0.14 |
|  | 70 | 12.4 | 10.8 | 2.81 | 0.06 | 0.14 |
|  | 100 | 12.3 | 4.62 | 1.96 | 0.04 | 0.12 |
| Sodium orthosilicate | 1 | 12.6 | 102 | 4.31 | 0.03 | 0.18 |
|  | 5 | 12.5 | 89.0 | 3.58 | 0.04 | 0.18 |
|  | 10 | 12.7 | 50.1 | 2.86 | 0.03 | 0.15 |
|  | 20 | 12.7 | 42.2 | 1.94 | 0.04 | 0.13 |
|  | 30 | 12.7 | 29.9 | 1.22 | 0.04 | 0.14 |
| Sodium silicate anhydride | 1 | 12.5 | 98.5 | 4.38 | 0.04 | 0.20 |
|  | 5 | 12.7 | 86.5 | 3.73 | 0.04 | 0.18 |
|  | 10 | 12.7 | 49.7 | 2.65 | 0.03 | 0.16 |
|  | 20 | 12.7 | 40.0 | 1.98 | 0.03 | 0.13 |
|  | 30 | 12.6 | 27.5 | 1.13 | 0.03 | 0.13 |
| Criterion Standard |  | — | <3.0 | — | <0.3 | — |

From the experimental results shown in Table 1, it can be understood that each main constituents constituting the treating agent for making harmless and immobilizing fly ash according to the present invention attribute to the immobilization of detrimental metals characteristically. Among them, the immobilizing effects of α starch and dextrin are remarkable and they can satisfy the criterion standard of Pb by an addition of 70 parts by weight of each alone. Thus, the result shows a high activity of the treating agent for making harmless and immobilizing fly ash according to the present invention. Further, sodium orthosilicate or sodium silicate anhydride showed excellent effect on Zn next to α starch and dextrin though no criterion standard is shown.

Allophane and sodium dihydrogen phosphate gives lowering of the eluted amount of Pb and Zn proportional to the amount added. However, the criterion standard for Pb cannot be satisfied. It was confirmed that the hydrogen ion concentration after treated by the main constituent each alone constituting the treating agent for making harmless and immobilizing fly ash according to the present invention is not substantially different from the value untreated.

EXAMPLE 2

Immobilizing effects of the compounds analogous to the main constituents in the treating agent for making harmless and immobilizing fly ash according to the present invention The immobilizing effects of the compounds analogous to the main constituents in the treating agent according to the present invention each alone were confirmed and compared to the immobilizing effects of the main constituents in the treating agent according to the present invention each alone.

|  | Amount added |
|---|---|
| (1) Untreated starch | 10 to 100 parts by weight |
| (2) Untreated allophane (mol. ratio < 2) | 10 to 100 parts by weight |
| (3) Phosphoric acid ($H_3PO_4$) liquid 85% | 10 to 100 parts by weight |
| (4) Sodium phosphate ($Na_3PO_4 \cdot 12H_2O$) | 10 to 100 parts by weight |
| (5) Sodium monohydrogen phosphate ($Na_2HPO_4 \cdot 12H_2O$) | 10 to 100 parts by weight |

The tests were carried out in the same manner as in Example 1. As phosphoric acid is liquid, it was weighed and added to fly ash while washing the vessel with 500 kg of water and then the mixture was milled to prepare the test sample.

The measured results of the eluted amounts of detrimental metals are shown in Table 2.

TABLE 2

Immobilizing effect of the compounds analogous to the main constituents in the treating agent according to the present invention

| Constituents | Amount added pts. by wt. | pH | Pb | Zn | Cd | Cu |
|---|---|---|---|---|---|---|
| Fly ash (No treated) | — | 12.6 | 198 | 5.80 | 0.10 | 0.39 |
| Untreated starch | 10 | 12.6 | 102 | 3.99 | 0.09 | 0.27 |
|  | 30 | 12.7 | 98.1 | 4.03 | 0.08 | 0.22 |
|  | 50 | 12.6 | 90.7 | 3.05 | 0.06 | 0.19 |
|  | 70 | 12.5 | 85.4 | 2.87 | 0.05 | 0.16 |
|  | 100 | 12.5 | 79.0 | 2.44 | 0.05 | 0.20 |
| Untreated allophane | 10 | 12.3 | 112 | 3.70 | 0.07 | 0.21 |
|  | 30 | 12.1 | 95.4 | 3.65 | 0.05 | 0.24 |
|  | 50 | 12.2 | 88.9 | 2.98 | 0.06 | 0.16 |
|  | 70 | 12.0 | 69.7 | 2.22 | 0.06 | 0.15 |
|  | 100 | 12.2 | 61.1 | 1.97 | 0.06 | 0.16 |
| Phosphoric acid ($H_3PO_4$) liquid 85% | 10 | 12.5 | 62.1 | 5.87 | 0.11 | 0.37 |
|  | 30 | 12.3 | 32.2 | 5.55 | 0.15 | 0.27 |
|  | 50 | 12.0 | 19.1 | 6.41 | 0.20 | 0.16 |
|  | 70 | 11.7 | 10.2 | 5.76 | 0.16 | 0.30 |
|  | 100 | 10.9 | 6.20 | 7.93 | 0.34 | 0.15 |
| Sodium phosphate | 10 | 12.5 | 97.6 | 4.88 | 0.06 | 0.18 |
|  | 30 | 12.4 | 70.5 | 3.94 | 0.06 | 0.18 |

TABLE 2-continued

Immobilizing effect of the compounds analogous to the main constituents in the treating agent according to the present invention

| Constituents | Amount added pts. by wt. | pH | Pb | Zn | Cd | Cu |
|---|---|---|---|---|---|---|
| ($Na_3PO_4 \cdot 12H_2O$) | 50 | 12.3 | 51.1 | 2.99 | 0.06 | 0.14 |
|  | 70 | 12.4 | 45.9 | 2.08 | 0.04 | 0.12 |
|  | 100 | 12.1 | 38.1 | 1.36 | 0.05 | 0.13 |
| Sodium monohydrogen phosphate ($Na_2HPO_4 \cdot 12H_2O$) | 10 | 12.2 | 57.5 | 4.35 | 0.05 | 0.20 |
|  | 30 | 12.5 | 39.9 | 3.92 | 0.04 | 0.16 |
|  | 50 | 12.6 | 20.3 | 3.00 | 0.04 | 0.14 |
|  | 70 | 12.2 | 9.22 | 2.56 | 0.04 | 0.13 |
|  | 100 | 12.3 | 4.89 | 1.77 | 0.05 | 0.13 |
| Criterion Standard | — | — | <3.0 | — | <0.3 | — |

As shown in Table 2, no immobilizing effect on Pb was observed by untreated starch (not made to be type α starch nor dextrin) and untreated allophane (molecular ratio <2) to confirm the necessity of the treatment by the treating agent according to the present invention.

As to the immobilizing effects of phosphoric acid, sodium phosphate and sodium monohydrogen phosphate on Pb, sodium monohydrogen phosphate and phosphoric acid did not satisfy the criterion standard but treating effects were observed. However, sodium phosphate showed no treating effect and it was found that no immobilizing effect could not be attained in the absence of hydrogen atom.

EXAMPLE 3

Synergetic effect of the main constituents of the treating agent for making harmless and immobilizing fly ash according to the present invention To confirm the synergetic effect of the main constituents of the treating agent for making harmless and immobilizing fly ash according to the present invention, immobilizing treatments either by the main constituent each alone and by a binary system were made to compare the amount eluted of the detrimental metals.

The eluted amounts were compared between the case in which each 50 kg (parts by weight) of the main constituent was used alone (Experiment Nos. 1 to 5) and the case in which 50 kg (parts by weight) of each two constituents were added (Experiment Nos. 6 to 13) based on 1 ton (1000 parts by weight) of the above-mentioned fly ash. 600 kg of water was added in all cases and the elution test was carried out after milled with no curing period to determine the eluted amounts of each detrimental metals.

Same procedure was carried out on the treating effect of the treating agent for making harmless and immobilizing fly ash according to the present invention in an example of a preferred constitution ratio (Experiment Nos. 14 and 15) and the eluted amounts of each detrimental metals were also measured in the case of absolutely no treatment.

The experimental results are shown in Table 3.

TABLE 3

Synergetic effect of the main constituents in the treating agent according to the present invention

| No. | Allo-phane | α starch | Dext-rin | Sodium dihyd. phosphate | Sodium ortho-silicate | pH | Cd | Cu | Pb | Zn |
|---|---|---|---|---|---|---|---|---|---|---|
| | | | Untreated | | | 12.4 | 0.10 | 0.38 | 166 | 5.62 |
| 1 | 50 | — | — | — | — | 12.4 | 0.06 | 0.22 | 43.3 | 3.85 |
| 2 | — | 50 | — | — | — | 12.4 | 0.06 | 0.20 | 6.84 | 4.38 |
| 3 | — | — | 50 | — | — | 12.4 | 0.07 | 1.28 | 5.60 | 4.82 |
| 4 | — | — | — | 50 | — | 12.1 | 0.08 | 1.00 | 5.89 | 6.05 |
| 5 | — | — | — | — | 50 | 12.6 | 0.05 | 0.18 | 32.2 | 1.05 |
| 6 | 50 | 50 | — | — | — | 12.4 | 0.06 | 0.16 | 4.96 | 2.09 |
| 7 | 50 | — | 50 | — | — | 12.4 | 0.07 | 0.15 | 4.35 | 2.52 |
| 8 | 50 | — | — | 50 | — | 12.2 | 0.08 | 0.12 | 4.51 | 2.83 |
| 9 | 50 | — | — | — | 50 | 12.5 | 0.05 | 0.10 | 9.62 | 0.85 |
| 10 | — | 50 | — | 50 | — | 12.1 | 0.09 | 0.14 | 2.69 | 1.33 |
| 11 | — | 50 | — | — | 50 | 12.4 | 0.05 | 0.11 | 6.75 | 1.42 |
| 12 | — | — | 50 | 50 | — | 12.3 | 0.08 | 0.13 | 2.44 | 1.50 |
| 13 | — | — | 50 | — | 50 | 12.7 | 0.05 | 0.10 | 8.37 | 1.02 |
| 14 | 50 | 50 | — | 40 | 10 | 12.4 | 0.05 | 0.10 | 1.76 | 0.67 |
| 15 | 50 | — | 50 | 40 | 10 | 12.5 | 0.05 | 0.14 | 1.64 | 0.47 |
| | | | Criterion Standard | | | — | <0.3 | — | <3.0 | — |

As shown in Table 3, it was confirmed that the immobilizing effects of each main constituent alone acted on each detrimental metal specifically. The tendency is remarkable in the treating effect on Pb and Zn. The immobilizing effect on Pb decreases in the order of dextrin, α starch, sodium dihydrogen phosphate, sodium silicate and allophane. Among them, dextrin, α starch and sodium dihydrogen phosphate are effective on Pb. However, dextrin and sodium dihydrogen phosphate gave a higher eluted amount of Cu than untreated. It can be considered hydrogen or phosphate group present in both dextrin and sodium dihydrogen phosphate acts reversely to prevent the immobilizing effect. Bodium silicate is effective on Zn.

Contrary to it, in binary systems, a combination of α starch with sodium dihydrogen phosphate or dextrin gave a higher effect than the case added alone and satisfied the criterion standard of 3 mg/l in reclamation to confirm a high synergism.

In addition, as apparent from the experimental results shown in Table 3, it was confirmed that the treating agent for making harmless and immobilizing fly ash according to the present invention gave a high synergism in such constitution ratios and affects effectively on all detrimental metals to prevent their eluted amount.

EXAMPLE 4

Immobilizing effect by the constitution ratio of the main constituents of the treating agent for making harmless and immobilizing fly ash according to the present invention To confirm the immobilizing effect by the constitution ratio of the main constituents of the treating agent for making harmless and immobilizing fly ash according to the present invention, the ratios of each constituents were varied to compare the eluted amounts of detrimental metals.

A given amount of 50 kg (parts by weight) of the component A was added to 1 ton (1000 parts by weight) of the above-mentioned fly ash and the constitution ratios of the components B and C were varied to a total amount added of 150 kg (parts by weight) to compare the eluted amount for each cases. The amount of water added was 600 kg in all cases and the elution test was carried out after milled with no curing period to determine the eluted amounts of each detrimental metals.

The experimental results are shown in Table 4.

TABLE 4

Immobilizing effect by the constitution ratio of the main constituents of the treating agent according to the present invention

| | Constituents (kg/TON) | | | | Eluted amount (mg/l) | | | | |
|---|---|---|---|---|---|---|---|---|---|
| | Comp. A | Comp. B | | Comp. C | | | | | |
| No. | α starch | Sodium ortho-silicate | Sodium dihyd. phosphate | Allo-phane | pH | Cd | Cu | Pb | Zn |
| 1 | 50 | 2 | 8 | 90 | 12.3 | 0.07 | 0.18 | 2.85 | 4.11 |
| 2 | 50 | 5 | 15 | 80 | 12.4 | 0.06 | 0.16 | 2.03 | 2.67 |
| 3 | 50 | 10 | 30 | 60 | 12.4 | 0.05 | 0.12 | 1.84 | 0.58 |

TABLE 4-continued

Immobilizing effect by the constitution ratio of the main constituents of the treating agent according to the present invention

| | Constituents (kg/TON) | | | | | | | | |
|---|---|---|---|---|---|---|---|---|---|
| | Comp. A | Comp. B | | Comp. C | | Eluted amount (mg/l) | | | |
| | α | Sodium ortho- | Sodium dihyd. | Allo- | | | | | |
| No. | starch | silicate | phosphate | phane | pH | Cd | Cu | Pb | Zn |
| 4 | 50 | 15 | 45 | 40 | 12.4 | 0.06 | 0.14 | 1.65 | 0.79 |
| 5 | 50 | 20 | 60 | 20 | 12.2 | 0.06 | 0.15 | 2.34 | 1.18 |
| 6 | 50 | 25 | 75 | 10 | 12.0 | 0.09 | 0.22 | 3.12 | 2.99 |
| 7 | 50 | 10 | 90 | — | 11.8 | 0.09 | 1.50 | 4.93 | 7.22 |
| 8 | 50 | 90 | 10 | — | 12.9 | 0.06 | 0.93 | 7.81 | 0.88 |
| 9 | 50 | — | — | 100 | 12.3 | 0.06 | 0.16 | 3.76 | 1.94 |
| 10 | | Untreated | | | 12.4 | 0.10 | 0.38 | 166 | 5.62 |
| | | Criterion Standard | | | — | <0.3 | — | <3.0 | — |

As shown in Table 4, it was confirmed that, when the constitution ratio of the components A, B and C were varied, cases in which 20 to 160 parts by weight of the component B and 40 to 180 parts by weight of the component C were added to 100 parts by weight of A (Experiment Nos. 1 to 5) satisfied the criterion standard of Pb and Cd to show excellent immobilizing effect. However, among the component B, it was found that a higher amount of sodium orthosilicate added gave a higher alkalinity to elute Pb again, while a higher amount of sodium dihydrogen phosphate gave a higher acidity to lower the pH and to elute Cu and Zn and also to fail to prevent elution of Pb. Especially, in Experiment No. 7, an excessive addition of sodium dihydrogen phosphate lowered the pH to elute a higher amount of Cu and Zn than in the case untreated to show no effect of addition.

From the experimental results, it was found that the preferred constitution ratio of the components A, B and C in the treating agent for immobilizing fly ash according to the present invention is 20 to 160 parts by weight of the component B and 40 to 180 parts by weight of the component C based on 100 parts by weight of the component A, more preferably 80 to 160 parts by weight of the component B and 40 to 120 parts by weight of the component C based on 100 parts by weight of the component A.

EXAMPLE 5

Immobilizing effect when the added amount of the treating agent for making harmless and immobilizing fly ash according to the present invention was varied The immobilizing effect when the amount of the treating agent for making harmless and immobilizing fly ash according to the present invention added to the fly ash formed from an urban dust incinerating plant was varied was confirmed. Each components of the treating agent according to the present invention used in the Example and their constitution ratios are as shown below.

| | Constitution ratio |
|---|---|
| (1) α starch | 40 weight % |
| (2) Allophane (mol. ratio ≧ 2) | 30 weight % |
| (3) Sodium dihydrogen phosphate (NaH$_2$PO$_4$·2H$_2$O) | 25 weight % |
| (4) Sodium orthosilicate | 5 weight % |

50, 100, 200, 300, 400 and 500 parts by weight of the treating agent for making harmless and immobilizing fly ash according to the present invention were respectively added to 1 ton (1000 parts by weight) of the above-mentioned fly ash and then 500 kg of water was added to it and the mixture was milled and elution tests were carried out with no curing period to determine the eluted amounts of detrimental metals.

The experimental results are shown in Table 5.

TABLE 5

Immobilizing effect when the added amount of the treating agent according to the present invention was varied

| Constituent | Amount added pts. by wt. | pH | Eluted amount (mg/l) | | | |
|---|---|---|---|---|---|---|
| | | | Pb | Zn | Cd | Cu |
| Fly ash (No treated) | — | 12.6 | 198 | 5.80 | 0.10 | 0.39 |
| Treating agent according to the present invention | 50 | 12.5 | 8.04 | 3.72 | 0.05 | 0.13 |
| | 100 | 12.6 | 4.40 | 3.00 | 0.04 | 0.10 |
| | 200 | 12.5 | 1.19 | 1.91 | 0.05 | 0.09 |
| | 300 | 12.3 | 0.73 | 1.22 | 0.05 | 0.07 |
| | 400 | 12.2 | 0.35 | 0.95 | 0.04 | 0.04 |
| | 500 | 12.1 | 0.28 | 0.72 | 0.04 | 0.05 |
| Criterion Standard | — | — | <3.0 | — | <0.3 | — |

From the experimental results shown in Table 5, it was found that a higher amount of the treating agent for making harmless and immobilizing fly ash according to the present invention added increased the eluted amounts of detrimental metals. When 200 kg of the treating agent of the present invention was added to 1 ton of the fly ash formed from an urban dust incinerating plant, it was confirmed the criterion standard was satisfied.

EXAMPLE 6

Immobilizing effect and long-term immobilizing performance of the treating agent for making harmless and immobilizing fly ash according to the present invention further containing cement The immobilizing effect of the treating agent for making harmless and immobilizing fly ash according to the present invention further containing cement was confirmed and the eluted amounts of detrimental metals during the curing period accompanied by the progress of crystallization reaction specific to cement were determined to evaluate the long-term immobilizing performance. Each components of the treating agent according to the present invention used in the Example and their constitution ratios are as shown below.

|  | Constitution ratio |
| --- | --- |
| (1) α starch | 16 weight % |
| (2) Allophane (mol. ratio ≥ 2) | 12 weight % |
| (3) Sodium dihydrogen phosphate ($NaH_2PO_4 \cdot 2H_2O$) | 10 weight % |
| (4) Sodium orthosilicate | 2 weight % |
| (5) Common portland cement | 60 weight % |

100, 200 and 300 parts by weight of the above treating agent for making harmless and immobilizing fly ash according to the present invention were respectively added to 1 ton (1000 parts by weight) of the above-mentioned fly ash and then 500 kg of water was added to it and the mixture was milled and elution tests were carried out either with no curing period to determine the eluted amounts of detrimental metals or with curing periods of 7 and 28 days and their results were compared.

The eluted amount and the long-term immobilizing performance in the case treated by common portland cement alone are also shown.

The experimental results are shown in Table 6.

From the experimental results shown in Table 6, it was confirmed that, when the treatment by the agent according to the present invention was compared to that by common portland cement alone with no curing period, the eluted amount of Pb showed a significant difference each other and the agent according to the present invention satisfied the criterion standard with no curing to give a high immobilizing performance. The product after treated by the agent according to the present invention gave a lower and lower elution after cured for 7 and 28 days. It was also assumed that the safety after reclamation could be assured together with the progress of crystallization reaction of the cement and thus it was stable for a long period.

On the other hand, when treated by common portland cement alone, the elution of Pb cannot satisfy the criterion standard even after cured for 28 days and it can be said to be inadequate as a treating method of fly ash formed from an urban dust incinerating plant used in reclamation.

EXAMPLE 7

Comparative experiment of the treating agent for making harmless and immobilizing fly ash according to the present invention further containing cement with other known treating agents The treating method by using the treating agent for making harmless and immobilizing fly ash according to the present invention further containing cement was compared with other treating methods by using sulfur chelating agents and special cement.

The agent described in the above Example 6 was used as the treating agent of the present invention. On the other hand, the following commercial products were used as the conventional treating agents. The methods for use were in accordance with the manuals of each manufacturers.

TABLE 6

Immobilizing effect and long-term immobilizing performance of the treating agent (containing cement) according to the present invention

| Constituents | Amount added pts. by wt. | pH | Eluted amount (mg/l) Pb | Zn | Cd | Cu | Curing period (days) |
| --- | --- | --- | --- | --- | --- | --- | --- |
| Fly ash (No treated) | — | 12.6 | 198 | 5.80 | 0.10 | 0.39 | 0 |
| Treating agent according to the present invention (cont. cement) | 100 | 12.7 | 2.55 | 0.42 | <0.03 | 0.05 | |
| | 200 | 12.8 | 1.78 | 0.23 | <0.03 | 0.04 | |
| | 300 | 12.8 | 0.96 | 0.16 | <0.03 | 0.04 | |
| Treating agent according to the present invention (cont. cement) | 100 | 12.4 | 1.63 | 0.19 | <0.03 | 0.05 | 7 |
| | 200 | 12.1 | 1.07 | 0.11 | <0.03 | 0.04 | |
| | 300 | 12.3 | 8.55 | 0.09 | <0.03 | 0.05 | |
| Treating agent according to the present invention (cont. cement) | 100 | 12.0 | 1.01 | 0.10 | <0.03 | 0.05 | 28 |
| | 200 | 11.9 | 0.80 | 0.07 | <0.03 | 0.05 | |
| | 300 | 11.8 | 0.31 | 0.03 | <0.03 | 0.05 | |
| Common portland cement | 100 | 12.6 | 90.7 | 0.53 | <0.03 | 0.10 | 0 |
| | 200 | 12.5 | 48.2 | 0.68 | <0.03 | 0.09 | |
| | 300 | 12.7 | 22.5 | 0.49 | <0.03 | 0.07 | |
| Common portland cement | 100 | 12.4 | 40.8 | 0.31 | <0.03 | 0.05 | 7 |
| | 200 | 12.5 | 17.3 | 0.30 | <0.03 | 0.04 | |
| | 300 | 12.5 | 7.48 | 0.22 | <0.03 | 0.05 | |
| Common portland cement | 100 | 12.1 | 14.3 | 0.16 | <0.03 | 0.05 | 28 |
| | 200 | 12.0 | 7.40 | 0.14 | <0.03 | 0.05 | |
| | 300 | 12.1 | 5.45 | 0.12 | <0.03 | 0.05 | |
| Criterion Standard | — | — | <3.0 | — | <0.3 | — | |

(1) A sulfur chelating agent (liquid)

(2) A sulfur chelating agent (liquid)

(3) Blast furnace cement type B (powder)

(4) Special cement for industrial waste (powder)

10, 30 and 50 kg (parts by weight) of the above sulfur chelating agent was respectively added to 1 ton (1000 parts by weight) of the above-mentioned fly ash and 300 kg of water was added in accordance with the manual and the mixture was milled and elution tests were carried out with no curing period to determine the eluted amounts of detrimental metals.

Each 100, 200 and 300 kg (parts by weight) of each of the treating agent for making harmless and immobilizing fly ash according to the present invention further containing cement, the above blast furnace cement type B and the special cement for industrial waste were added to 1 ton (1000 parts by weight) of the above-mentioned fly ash and the mixture was milled and then after 7 days curing period the elution tests were carried out in the same manner as above to determine the eluted amounts of detrimental metals for the comparison of each treating agents.

The experimental results are shown in Table 7.

TABLE 7

Comparison of the method by using the treating agent (containing cement) according to the present invention with the methods by using other known treating agents

| Constituent | Amount added pts. by wt. | pH | Pb | Zn | Cd | Cu |
|---|---|---|---|---|---|---|
| Fly ash (No treated) | — | 12.6 | 198 | 5.80 | 0.10 | 0.39 |
| Treating agent according to the present invention (cont. cement) | 100 | 12.4 | 1.63 | 0.19 | <0.03 | 0.05 |
|  | 200 | 12.1 | 1.07 | 0.11 | <0.03 | 0.04 |
|  | 300 | 12.2 | 0.96 | 0.09 | <0.03 | 0.05 |
| Commercial product Sulfur chelating agent | 10 | 12.3 | 76.2 | 4.11 | 0.05 | 0.30 |
|  | 30 | 12.2 | 27.9 | 2.86 | 0.04 | 0.17 |
|  | 50 | 12.3 | 3.22 | 0.57 | <0.03 | 0.09 |
| Commercial product Sulfur chelating agent | 10 | 12.1 | 55.8 | 3.22 | 0.05 | 0.19 |
|  | 30 | 12.2 | 22.1 | 2.51 | <0.03 | 0.10 |
|  | 50 | 12.3 | 6.10 | 1.10 | <0.03 | 0.06 |
| Commercial product Blast furnace cement type | 100 | 12.5 | 6.13 | 0.33 | <0.03 | 0.05 |
|  | 200 | 12.6 | 4.15 | 0.19 | <0.03 | 0.06 |
|  | 300 | 12.4 | 3.79 | 0.20 | <0.03 | 0.06 |
| Commercial product Special cement for industrial waste | 100 | 12.1 | 9.00 | 0.41 | <0.03 | 0.06 |
|  | 200 | 12.0 | 5.37 | 0.31 | <0.03 | 0.06 |
|  | 300 | 12.0 | 3.82 | 0.18 | <0.03 | 0.06 |
| Criterion Standard | — | — | <3.0 | — | <0.3 | — |

The results in Table 7 shows a treating method by the inventive agent and typical treating methods by using chemicals and cement. The agents other than the inventive agent could not satisfy the criterion standard of Pb elution and it was confirmed that the immobilizing performance of the inventive agent is most excellent.

The treating agent for making harmless and immobilizing fly ash according to the present invention can enclose stably detrimental metals contained in fly ash formed from an urban dust incinerating plant even under a highly alkaline condition with no re-elution and is highly effective for the immobilizing treatment of detrimental metals. The treating agent of the present invention requires no curing period for immobilizing detrimental metals to allow a rapid treatment and to eliminate the curing space advantageously.

A fly ash formed from an urban dust incinerating plant containing detrimental metals can be immobilized rapidly by using the treating method according to the present invention using such a treating agent for making harmless and immobilizing fly ash.

What is claimed is:

1. A treating agent for immobilizing fly ash of an urban dust incinerator, the fly ash contains at least one noxious metal selected from the group consisting of cadmium, lead, zinc and copper, the treating agent comprises a mixture of components A, B and C, where component A is selected from the group consisting of α starch and dextrin, component B is selected from the group consisting of sodium silicate and a hydrogen phosphate compound, and component C is an allophane having a molecular ratio of $SiO_2/Al_2O_3$ of not less than 2, wherein the mixing ratio of said component A: component B: component C is 100 parts by weight of component A, 20 to 160 parts by weight of component B, and 40 to 180 parts by weight of component C.

2. A treating agent according to claim 1, in which said treating agent further contains at least one selected from the group consisting of cement, bentonite, calcined gypsum and fly ash formed from a coal thermoelectric power plant.

3. A method for the treatment for immobilizing fly ash of an urban dust incinerator, wherein the fly ash contains at least one noxious metal selected from the group consisting of cadmium, lead, zinc and copper, and, the treating agent comprises a mixture of components A, B and C, where component A is selected from the group consisting of α starch and dextrin, component B is selected from the group consisting of sodium silicate and a hydrogen phosphate compound, and component C is an allophane having a molecular ratio of $SiO_2/Al_2O_3$ of not less than 2, wherein the mixing ratio of said component A: component B: component C is 100 parts by weight of component A, 20 to 160 parts by weight of component B, and 40 to 180 parts by weight of component C, the steps comprising: (1) the treating agent is mixed with the fly ash to form a fly ash treating agent mixture; (2) water is added to the fly ash treating agent mixture; and (3) the resulting mixture is milled.

4. A method for the treatment according to claim 3, in which at least one selected from the group consisting of cement, bentonite, calcined gypsum and fly ash formed from a coal thermoelectric power plant is further mixed together with said components A to C.

* * * * *